United States Patent
Pernicha

(10) Patent No.: US 9,894,100 B2
(45) Date of Patent: Feb. 13, 2018

(54) DYNAMICALLY OPTIMIZED SECURITY POLICY MANAGEMENT

(71) Applicant: Fortinet, Inc., Sunnyvale, CA (US)

(72) Inventor: Hugo Filipe Parreira Pernicha, Venda do Pinheiro (PT)

(73) Assignee: Fortinet, Inc., Sunnyvale, CA (US)

( * ) Notice: Subject to any disclaimer, the term of this patent is extended or adjusted under 35 U.S.C. 154(b) by 119 days.

(21) Appl. No.: 14/566,403

(22) Filed: Dec. 30, 2014

(65) Prior Publication Data

US 2016/0191466 A1 Jun. 30, 2016

(51) Int. Cl.
H04L 29/06 (2006.01)

(52) U.S. Cl.
CPC .................... H04L 63/20 (2013.01)

(58) Field of Classification Search
CPC ............... H04L 63/0263; H04L 63/20
See application file for complete search history.

(56) References Cited

U.S. PATENT DOCUMENTS

| 8,397,282 | B2 * | 3/2013 | Turley | H04L 63/0263 726/11 |
| 8,478,852 | B1 * | 7/2013 | Roy | H04L 12/6418 709/223 |
| 2001/0039576 | A1 * | 11/2001 | Kanada | H04L 41/0893 709/223 |
| 2002/0069200 | A1 * | 6/2002 | Cooper | H04L 12/2602 |
| 2002/0078382 | A1 * | 6/2002 | Sheikh | H04L 12/2602 726/22 |
| 2002/0152209 | A1 * | 10/2002 | Merugu | H04L 47/10 |
| 2002/0154635 | A1 * | 10/2002 | Liu | H04L 63/0428 370/392 |
| 2002/0198981 | A1 * | 12/2002 | Corl, Jr. | H04L 29/06 709/224 |
| 2003/0179703 | A1 * | 9/2003 | Levy | H04L 41/06 370/230 |

(Continued)

OTHER PUBLICATIONS

Chen et al., ("Cross-Domain Privacy-Preserving Cooperative Firewall Optimization", Oct. 2012, IEEE/ACM Transactions on Networking, vol. 21, No. 3, pp. 857-868.*

(Continued)

Primary Examiner — Kenneth Chang
(74) Attorney, Agent, or Firm — Hamilton, DeSanctis & Cha LLP

(57) ABSTRACT

Methods and systems for dynamically optimized rule-based security policy management are provided. A request is received by a network security management device to add a new traffic flow policy rule to multiple existing policy rules managed by the network security management device. Dependencies of the new traffic flow policy rule on the existing policy rules are automatically determined. An updated set of policy rules is formed by incorporating the new traffic flow policy rule within the existing policy rules based on the dependencies. The updated set of policy rules is then optimized by grouping, reordering and/or deleting a sub-set of policy rules of the updated set of policy rules based on one or more of weights assigned to particular types of traffic, preference settings, priority settings, network traffic characteristics and usage statistics for each policy rule of the updated set of policy rules.

26 Claims, 9 Drawing Sheets

500

| Administrator Inserted Information | | | | | | System Statistics | |
|---|---|---|---|---|---|---|---|
| Index | Source | Destination | Service | Action | Priority | Sessions | % Sessions |
| 1 | 192.168.0.0/24 | ALL | DNS, HTTP, HTTPS | Allow | Normal | 50000 | 25.00% |
| 2 | 192.168.1.0/24 | ALL | DNS, HTTP, HTTPS, SMTP | Allow | Normal | 40000 | 20.00% |
| 3 | ALL | 192.168.3.1 | HTTP | Allow | HIGH | 10000 | 5.00% |
| 4 | ALL | 192.168.3.2 | SMTP | Allow | HIGH | 15000 | 7.50% |
| 5 | 192.168.3.1 | 192.168.1.80 | HTTP | Allow | HIGH | 5000 | 2.50% |
| 6 | 192.168.3.2 | 192.168.1.25 | SMTP | Allow | HIGH | 15000 | 7.50% |
| 7 | 192.168.3.2 | 192.168.0.0/16 | ANY | Block | | 50000 | 25.00% |
| 8 | 192.168.3.2 | ALL | DNS, SMTP | Allow | HIGH | 15000 | 7.50% |
| 9 | ALL | ALL | ANY | Block | | | |

(56) References Cited

U.S. PATENT DOCUMENTS

| | | | | |
|---|---|---|---|---|
| 2004/0177139 A1* | 9/2004 | Schuba | H04L 41/0873 | 709/223 |
| 2006/0013136 A1* | 1/2006 | Goldschmidt | H04L 47/10 | 370/235 |
| 2006/0248580 A1* | 11/2006 | Fulp | H04L 63/20 | 726/11 |
| 2007/0115916 A1* | 5/2007 | Nguyen | H04L 41/0893 | 370/351 |
| 2008/0062994 A1* | 3/2008 | Porat | H04L 45/00 | 370/392 |
| 2009/0125470 A1* | 5/2009 | Shah | H04L 63/0263 | 706/47 |
| 2010/0100468 A1* | 4/2010 | Spector | G06Q 20/04 | 705/35 |
| 2010/0100954 A1* | 4/2010 | Yang | H04L 63/0263 | 726/11 |
| 2010/0199346 A1* | 8/2010 | Ling | H04L 63/0263 | 726/12 |
| 2012/0185913 A1* | 7/2012 | Martinez | G06F 9/455 | 726/1 |
| 2015/0033285 A1* | 1/2015 | Gao | H04L 63/0263 | 726/1 |

OTHER PUBLICATIONS

AlgoSec BusinessFlow®. "Data Center Application Connectivity Management." 2013. 2 pages.

AlgoSec. "Managing Security at the Speed of Business." 2014. 6 pages.

Ema. "FireMon's Security Manager V7.0 Release Expands Value to Enterprises and Service Providers." 2013. 4 pages.

Tufin. SecureTrackTM. "Firewall Operations Management, Auditing & Compliance." Feb. 2012. 10 pages.

* cited by examiner

|     | Host/Network | Peer Host/Network | Ports | Business Case/tag | rule ID/seq |
|---|---|---|---|---|---|
| 301a | 10.184.17.0/26 | 10.135.32.0/26 | All | Initial Project | 1 |
|  | 10.184.17.0/26 | 10.135.250.128/27 | All | Initial Project | 1 |
| 303a | buss-server01 | 10.135.35.121 | 3315/TCP, 3380/TCP, 3366/UDP, 3390/TCP | Initial Project | 3 |
|  | buss-server02 | 10.135.35.121 | 3315/TCP, 3380/TCP, 3366/UDP, 3390/TCP | Initial Project | 3 |
|  | buss-server01 | 10.135.35.122 | 3315/TCP, 3380/TCP, 3366/UDP, 3390/TCP | Initial Project | 3 |
|  | buss-server01 | 10.135.35.121 | 3323/TCP | Management | 4 |
|  | buss-server02 | 10.135.35.121 | 3323/TCP | Management | 4 |
|  | buss-fe01 | 10.135.35.116 | 1024/TCP | web_API integration | 5 |
|  | buss-fe02 | 10.135.35.116 | 1024/TCP | web_API integration | 5 |
|  | buss-server01 | 10.135.35.121 | 3322/TCP | Management | 4 |
|  | buss-fe01 | 10.135.250.11 | 443/TCP | Voucher Integration | 8 |
|  | buss-fe02 | 10.135.250.11 | 443/TCP | Voucher Integration | 8 |
|  | buss-fe01(10.184.17.51) | 10.135.67.41, 10.135.67.42, 10.135.67.43, 10.135.67.44, 10.135.67.45 | 443 | Auto Integration | 9 |
|  | buss-fe02(10.184.17.52) | 10.135.67.41, 10.135.67.42, 10.135.67.43, 10.135.67.44, 10.135.67.45 | 443 | Auto Integration | 9 |
|  | buss-fe01 | Host 10.135.35.53 | Deny tcp-1024 | Security problem | 11 |
|  | buss-fe01(10.184.17.51) | 10.134.101.133, 10.134.101.134, 10.134.101.135 | TCP 80, 443 | Cloud Integration | 10 |
|  | buss-fe01 | Host 10.135.35.53 | Allow any | Management | 12 |
|  | buss-sdb-fe01 | 10.135.63.200 | TCP 7022, 1435, 5024 | Management | 13 |
|  | buss-sdb-fe02 | 10.135.63.200 | TCP 7022, 1435, 5024 | Management | 13 |
|  | buss-server01 | 10.184.18.21 | TCP 3300 | Management | 14 |
|  | buss-jumpbox-win01 | 10.134.160.0/21 | ICMP e TCP 3389 | Management | 15 |

FIG. 3A

|     | Host/Network | Peer Host/Network | Ports | Business Case/tag | Priority |
|---|---|---|---|---|---|
| 399 | buss-fe01 | 10.135.35.0/24 | TCP-1024 | web_API integration | HIGH |

| Administrator Inserted Information | | | | | System Statistics | |
|---|---|---|---|---|---|---|
| Index | Source | Destination | Service | Action | Priority | Sessions | % Sessions |
| 1 | 192.168.0.0/24 | ALL | DNS, HTTP, HTTPS | Allow | Normal | 50000 | 25.00% |
| 2 | 192.168.1.0/24 | ALL | DNS, HTTP, HTTPS, SMTP | Allow | Normal | 40000 | 20.00% |
| 3 | ALL | 192.168.3.1 | HTTP | Allow | HIGH | 10000 | 5.00% |
| 4 | ALL | 192.168.3.2 | SMTP | Allow | HIGH | 15000 | 7.50% |
| 5 | 192.168.3.1 | 192.168.1.80 | HTTP | Allow | HIGH | 5000 | 2.50% |
| 6 | 192.168.3.2 | 192.168.1.25 | SMTP | Allow | HIGH | 15000 | 7.50% |
| 7 | 192.168.3.2 | 192.168.0.0/16 | ANY | Block | | 50000 | 25.00% |
| 8 | 192.168.3.2 | ALL | DNS, SMTP | Allow | HIGH | 15000 | 7.50% |
| 9 | ALL | ALL | ANY | Block | | | |

FIG. 5A

| Administrator Inserted Information | | | | | | System Statistics | |
|---|---|---|---|---|---|---|---|
| Index | Source | Destination | Service | Action | Priority | Dependencies | Sessions | % Sessions |
| 1 | 192.168.0.0/24 | ALL | DNS, HTTP, HTTPS | Allow | Normal | | 50000 | 25.00% |
| 2 | 192.168.1.0/24 | ALL | DNS, HTTP, HTTPS, SMTP | Allow | Normal | | 40000 | 20.00% |
| 3 | ALL | 192.168.3.1 | HTTP | Allow | HIGH | | 10000 | 5.00% |
| 4 | ALL | 192.168.3.2 | SMTP | Allow | HIGH | | 15000 | 7.50% |
| 5 | 192.168.3.1 | 192.168.1.80 | HTTP | Allow | HIGH | | 5000 | 2.50% |
| 6 | 192.168.3.2 | 192.168.1.25 | SMTP | Allow | HIGH | Execution Order Locked with Rule 7 | 15000 | 7.50% |
| 7 | 192.168.3.2 | 192.168.0.0/16 | ANY | Block | | Partialy Shadows Rule 8 | 50000 | 25.00% |
| 8 | 192.168.3.2 | ALL | DNS, SMTP | Allow | HIGH | Partialy Shadowed by Rule 7 | 15000 | 7.50% |
| 9 | ALL | ALL | ANY | Block | | | | |

FIG. 5B

| | Administrator Inserted Information | | | | | | | System Statistics | |
|---|---|---|---|---|---|---|---|---|---|
| Index | Source | Destination | Service | Action | Priority | Dependencies | Dependencies A | Dependencies B | Sessions | % Sessions |
| 1 | 192.168.0.0/24 | ALL | DNS, HTTP, HTTPS | Allow | Normal | | Partially Groupable with Rule 2 | 50000 | 25.00% |
| 2 | 192.168.1.0/24 | ALL | DNS, HTTP, HTTPS, SMTP | Allow | Normal | | Partially Groupable with Rule 1 | 40000 | 20.00% |
| 3 | ALL | 192.168.3.1 | HTTP | Allow | HIGH | | | 10000 | 5.00% |
| 4 | ALL | 192.168.3.2 | SMTP | Allow | HIGH | | | 15000 | 7.50% |
| 5 | 192.168.3.1 | 192.168.1.80 | HTTP | Allow | HIGH | | | 5000 | 2.50% |
| 6 | 192.168.3.2 | 192.168.1.25 | SMTP | Allow | HIGH | Execution Order Locked With Rule 7 | | 15000 | 7.50% |
| 7 | 192.168.3.2 | 192.168.0.0/16 | ANY | Block | | Partially Shadows Rule 8 | | 50000 | 25.00% |
| 8 | 192.168.3.2 | ALL | DNS, SMTP | Allow | HIGH | Partially Shadowed by Rule 7 | Partially Groupable with Rule 2 | 15000 | 7.50% |
| 9 | ALL | ALL | ANY | Block | | | | | |

FIG. 5C

| Optimization Criteria: Performance Based on Statistics |||||||||
|---|---|---|---|---|---|---|---|---|
| Administrator Inserted Information |||||||| System Statistics ||
| Index | Source | Destination | Service | Action | Priority | Optimization Notes | Sessions | % Sessions |
| 1 | 192.168.0.0/23 | ALL | DNS, HTTP, HTTPS | Allow | Normal | Partial Merge of Rules 1 and 2 | 50000 | 25.00% |
| 2 | 192.168.3.2 | 192.168.1.25 | SMTP | Allow | HIGH | Reorder of Rule 6 | 15000 | 7.50% |
| 3 | 192.168.3.2 | 192.168.0.0/16 | ANY | Block |  | Reorder of Rule 7 due to High Volume of Hits | 50000 | 25.00% |
| 4 | 192.168.1.0/24 192.168.3.2 | ALL | DNS, SMTP | Allow | Normal/ HIGH | Partial Merge of Rules 2 and 8 | 55000 | 27.50% |
| 5 | ALL | 192.168.3.2 | SMTP | Allow | HIGH | Reorder of Rule 4 | 15000 | 7.50% |
| 6 | ALL | 192.168.3.1 | HTTP | Allow | HIGH | Reorder of Rule 3 | 10000 | 5.00% |
| 7 | 192.168.3.1 | 192.168.1.80 | HTTP | Allow | HIGH | Left in the End due to Lowest Number of Hits | 5000 | 2.50% |
| 9 | ALL | ALL | ANY | Block |  |  |  |  |

FIG. 5D

| Optimization Criteria: Performance Based on Priority |||||||||
|---|---|---|---|---|---|---|---|---|
| Administrator Inserted Information |||||||| System statistics ||
| Index | Source | Destination | Service | Action | Priority | Optimization Notes | Sessions | % sessions |
| 2 | 192.168.3.2 | 192.168.1.25 | SMTP | Allow | HIGH | Reorder of Rule 6 | 15000 | 10.00% |
| 3 | 192.168.3.2 | 192.168.0.0/16 | ANY | Block |  | Reorder of Rule 7 due to High Volume of Hits | 50000 | 33.33% |
| 4 | 192.168.1.0/24 192.168.3.2 | ALL | DNS,SMTP | Allow | Normal/ HIGH | Partial Merge of Rules 2 and 8 | 55000 | 36.67% |
| 5 | ALL | 192.168.3.2 | SMTP | Allow | HIGH | Reorder of Rule 4 | 15000 | 10.00% |
| 6 | ALL | 192.168.3.1 | HTTP | Allow | HIGH | Reorder of Rule 3 | 10000 | 6.67% |
| 7 | 192.168.3.1 | 192.168.1.80 | HTTP | Allow | HIGH | Left in the End due to Lowest Number of Hits | 5000 | 3.33% |
| 1 | 192.168.0.0/23 | ALL | DNS,HTTP,HTTPS | Allow | Normal | Partial Merge of Rules 1 and 2 and Reorder | 50000 | 33.33% |
| 9 | ALL | ALL | ANY | Block |  |  |  |  |

FIG. 5E

DYNAMICALLY OPTIMIZED SECURITY POLICY MANAGEMENT

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014, Fortinet, Inc.

BACKGROUND

Field

Embodiments of the present invention generally relate to network traffic control. In particular, embodiments of the present invention relate to systems and methods for firewall and/or access control policy management and optimization of policy rules to enhance performance of policy rule processing.

Description of the Related Art

A firewall generally represents an integrated collection of security measures designed to prevent unauthorized electronic access to a networked computer system. A firewall may assume the form of a flow control device or set of devices configured to permit, deny, encrypt, decrypt and/or proxy computer traffic between different security domains based upon a set of rules and other criteria. Organizations that use Internet Protocol (IP) based communication networks have firewalls or access control devices/mechanisms to control the traffic that crosses into and out of their networks, or between different network segments. Each firewall is basically a special-purpose computer that enforces the organization's traffic filtering policy. Typically, the filtering policy is implemented in a rule base, which is an ordered list of rules, wherein each rule consists of a set of field value-ranges, and an associated action that is generally either "PASS" or "DROP".

Most firewalls enforce the policy according to "first-match" semantics, wherein for each new IP connection, the firewall checks the rules one by one, according to their order in the rule-base, until it finds a rule that matches the new connection. The first rule that matches the connection determines the firewall's action, wherein if the first matching rule has an action of "PASS" then the firewall will allow the connection to continue, and if the rule's action is "DROP" then the firewall will discard all the packets belonging to the connection. If no rule matches the connection then the firewall uses a default action, which is usually DROP.

As firewall or access control policies can have numerous rules, searching for a matching rule in sequence can require considerable CPU time. In such an implementation, the computational effort to match a connection to the rule-base is proportional (linearly) to the number of rules the firewall needs to try in sequence until it reaches the first matching rule. If checking a match against one rule typically requires M computer instructions, then checking K rules in sequence requires K times M instructions. If the first-matching rule happens to be one of the first in the rule-base, the firewall will identify the corresponding action quickly and with a low computational effort. Conversely, if the first-matching rule is near the end of the rule-base, the firewall will take longer to identify the corresponding action.

Firewall rule-based policy is typically static. As such, once it is configured, it will stay the same, in the same order and not be changed unless explicitly changed by a user/administrator. In practice, large enterprises end up with a substantial set of firewall rule-based policies that are more oriented to user/operator visibility than rule processing efficiency. Furthermore, addition of each new policy rule or modification of an existing rule typically has ripple effects on other existing/stored rules and policies. For instance, a new policy rule may be configured to allow packets of a specific traffic type to a given destination, which otherwise may have been denied by an already existing policy rule in the rule database. Existing security policy management techniques require manual detection of issues, such as duplication of rules, conflicts between rules, dependency between rules, or shadowing of one rule by another and therefore are error prone. These issues are exacerbated in the context of large policy rule databases.

There is therefore a need for systems and methods that allow efficient addition or modification of one or more policy rules by enabling enhanced system performance, manageability and reduced human error. There is also a need for systems and methods that allow dynamic and automatic optimization of policy rules by efficiently grouping/merging, deleting, reordering and otherwise managing policy rules based on defined and configurable optimization criteria so as to enable improved overall performance and significant reduction in session establishment/rule access/rule processing delay.

SUMMARY

Methods and systems are described for dynamically optimizing rule-based security policies. According to one embodiment, a security policy optimization method is provided. A request is received by a network security management device to add a new traffic flow policy rule to multiple existing policy rules managed by the network security management device. Dependencies of the new traffic flow policy rule on one or more of the existing policy rules are automatically determined. An updated set of policy rules is formed by incorporating the new traffic flow policy rule within the existing policy rules based on the determined dependencies. The updated set of policy rules is then optimized by (i) grouping a first sub-set of policy rules of the updated set of policy rules; (ii) reordering a second sub-set of policy rules of the updated set of policy rules; and/or (iii) deleting a third sub-set of policy rules of the updated set of policy rules based on one or more of weights assigned to particular types of traffic, preference settings, priority settings, network traffic characteristics and usage statistics for each policy rule of the updated set of policy rules.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 3A and 3B illustrate addition of a new security policy rule to a policy rule database in accordance with an embodiment of the present invention.

FIGS. 5A to 5E illustrate exemplary optimization of policy rules stored in a rule database based on dependencies, priorities, traffic attributes, hits, sessions, potential of merger/modification/deletion, among other attributes in accordance with an embodiment of the present invention.

DETAILED DESCRIPTION

Figure 1:
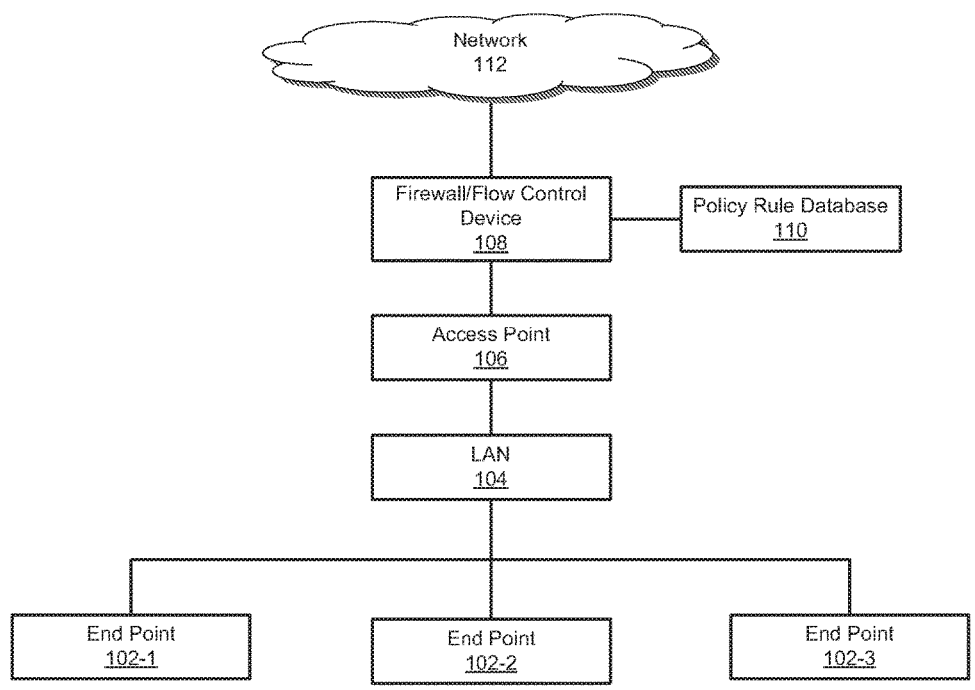
FIG. 1 illustrates exemplary security policy architecture in accordance with an embodiment of the present invention.

Methods and systems are described for dynamically optimizing rule-based security policies. Methods and systems are also provided for creation and modification of firewall/access control policy rules so as to allow enhanced computing performance, rule management, policy optimization, and session/network traffic packet flow management. Methods and systems are further provided for optimizing the security policy rules by performing any or a combination of reordering, grouping, updating, deleting, along with performing any other actions on one or more policy rules based on parameters, including, but not limited to, weights assigned to traffic attributes (e.g., source address, destination address, service, port information, among other such attributes), preference settings, priority settings for the policy rules, network traffic characteristics, network usage statistics, among other optimization parameters.

In the following description, numerous specific details are set forth in order to provide a thorough understanding of embodiments of the present disclosure. It will be apparent to one skilled in the art that embodiments of the present disclosure may be practiced without some of these specific details. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

Various embodiments are described assuming rule optimization and/or dependency detection are performed in real-time responsive to the proposed addition of a new traffic flow policy rule to an existing set of policy rules. Those skilled in the art will appreciate, however, that rule optimization and/or dependency detection may also or alternatively be performed in the background.

Notably, while embodiments of the present disclosure may be described using modular programming terminology, the code implementing various embodiments of the present disclosure is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Aspects of the present disclosure provide a method that can be implemented in a network security management device for automatically optimizing security policy rules in real-time based on traffic conditions or when one or more traffic rules are added/edited/deleted/modified. According to one embodiment, the method includes receiving, by the network security management device, a request to add a new traffic flow policy rule to a repository of existing control rules. In an aspect, such a request can either be manually generated by say a user/administrator or can be automatically generated based on traffic pattern/characteristics, network usage statistics, user activities, among other like actions. One should also appreciate that even though part of the disclosure has been explained with reference to new rules being added, the same systems/methods is also clearly applicable to any other action that needs to be taken place on existing set of traffic flow policy rules such as modification of one or more rules stored in rule repository or even deletion of one or more rules.

In an aspect, upon receipt of the request to add the new traffic flow policy rule, network security management device can be configured to automatically determine dependencies of the new traffic flow policy rule on one or more policy rules, and form an updated set of policy rules based on the determined dependencies. Methods of the present disclosure can further be configured to automatically optimize, by means of the network security management device, the updated set of policy rules by one or more of grouping a first sub-set of policy rules of the updated set of policy rules, reordering a second sub-set of policy rules of the updated set of policy rules, and deleting a third sub-set of policy rules of the updated set of policy rules, wherein such optimization of the updated set of policy rules can be performed based on one or more of weights assigned to particular types of traffic, preference settings, priority settings, network traffic characteristics, and network usage statistics for the policy rules of the updated set of policy rules.

According to one embodiment, dependencies can be determined by means of evaluation of dependence in execution of the new traffic flow policy rule on one or more policy rules. In another aspect, grouping of the first sub-set of policy rules of the updated set of policy rules can include merging combinable policy rules of the first sub-set of policy rules into a single policy rule, wherein the merging can be conducted based on matching of one or more of source Internet Protocol (IP) addresses, destination (IP) addresses, services, applications, interfaces, rule tags, priorities, and parameters of the combinable policy rules. According to another embodiment, merging of the combinable policy rules can be conducted based on superneting of one or more of the source IP addresses and the destination IP addresses.

According to another embodiment, reordering a second sub-set of policy rules can include changing an order of policy rules of the second sub-set of policy rules based on one or more of their source IP addresses, destination IP addresses, network usage statistics, applications, interfaces, rule tags, priorities, and parameters. According to one embodiment, order of the policy rules of the second sub-set of policy rules can be changed based on frequency of usage thereof.

According to another embodiment, deleting a third sub-set of policy rules can include deleting policy rules of the third sub-set of policy rules based on one or more conflicts between policy rules of the third sub-set of policy rules and the updated set of policy rules. In an exemplary embodiment, the one or more conflicts can include existence of a duplicate policy rule in the policy rules of the third sub-set of policy rules and the updated set of policy rules. One or more conflicts can also include one or more policy rules of the updated set of policy rules that are contrary to the new traffic flow policy rule. According to one embodiment, when conflicts exist between a denied traffic flow and an allowed traffic flow, in order to avoid creating a potential security issue, the denied traffic flow will be placed before the allowed traffic flow. Alternatively, if an advantage exists, the allowed traffic flow can be split to suppress the denied traffic flow.

According to one embodiment, weights assigned to types of traffic can be defined manually based on scope and attributes of policy rule or can be defined automatically. According to another embodiment, formation of the updated set of policy rules can be conducted/performed based on the one or more weights, the preference settings, the priority settings for the policy rules, network traffic characteristics, and network usage statistics.

Aspects of the present disclosure also provide for a system for automatically optimizing security policy rules in real-time based on network traffic conditions/characteristics/usage in addition to when one or more traffic rules are added/modified. According to one embodiment, system of the present disclosure can include a business traffic flow input module configured to receive a request to add a new traffic flow policy rule to a repository of existing policy rules managed by the system. The system can further include a dependency detection module configured to automatically determine dependencies of the new traffic flow policy rule on one or more policy rules, and a traffic flow policy rule incorporation module configured to form an updated set of policy rules by incorporating the new traffic flow policy rule within the policy rules based on the determined dependencies. System of the present disclosure can further include a policy rule optimization module configured to automatically optimize the updated set of policy rules by one or more of grouping a first sub-set of policy rules of the updated set of policy rules, reordering a second sub-set of policy rules of the updated set of policy rules, and deleting a third sub-set of policy rules of the updated set of policy rules based on one or more of weights assigned to particular types of traffic, preference settings, priority settings, network traffic characteristics, and network usage statistics for the policy rules of the updated set of policy rules.

FIG. 1 illustrates an exemplary security policy implementation architecture 100 in accordance with an embodiment of the present disclosure. In the context of the present simplified example, a protected network coupled to a public network 112 (e.g., the Internet) includes a firewall/flow control device 108, a policy rule database 110, an access point 106 and a local area network (LAN) 104 containing multiple end points 102-1, 102-2 and 102-3. When a system residing outside of the protected network attempts to communicate with a device on LAN 104 or when end points 102-1, 102-2 or 102-3 attempt to access network 112 or any resource within the network 112 through access point 106, a network security management device, (e.g., firewall/flow control device 108), which is configured to, among other things, monitor and/or filter traffic flow between end points 102 and network 112, determines whether the attempted access/communication is permitted by the enterprise security policy.

According to one embodiment, the enterprise security policy is represented by a set of rules (e.g., assess control lists (ACLs), traffic flow control rules, etc.) stored within policy rule database 110 that are used for filtering traffic flow (e.g., blocking or allowing packets between LAN 104 and network 112). Those skilled in the art will appreciate that policy rule database 110 may be separate from firewall/flow control device 108 or integral to firewall/flow control device 108.

Those skilled in the art will appreciate, end points 102 may represent a variety of different operating environments. For example, end points 102 may include, but are not limited to, personal computers (PCs), end user workstations, server computers, mobile computer systems (e.g., hand-held devices, tablet computers, laptop devices), multiprocessor systems, microprocessor-based systems, programmable consumer electronics, network PCs, minicomputers, mainframe computers, distributed computing environments and the like.

According to one embodiment, although the firewall/flow control device 108 in the present illustration is depicted as residing between access point 106 and network 112, in other example implementations, firewall/flow control device 108 may simply be logically interposed between end points 102 and network 112, and therefore various other network architectures/configurations are possible. In an aspect, the monitored network traffic can include, but is not limited to, HyperText Transfer Protocol (HTTP) traffic, File Transfer Protocol (FTP) traffic, Domain Name System (DNS) requests/responses, unclassified (e g, unknown) or classified (e.g., known) application traffic and/or other types of traffic (e.g., traffic using other types of known or unknown protocols).

As explained earlier, existing firewall/flow control devices or network security management device use static policy rules to filter/block/allow traffic entering or leaving a protected network and once configured, the firewall/flow control device always searches through the same set of policy rules in the same hierarchical order. This hierarchical based execution of policy rules may delay the decision to allow/block the traffic and may impact the performance of the network. In a typical enterprise set-up, a firewall/flow control device can have thousands of policy rules, some of which may be generic policy rules that are applicable to all the traffic flow from/to network 112 and others of which may be specific to a set or range of source IP addresses, destination IP addresses, applications, ports and/or services. As discussed in the Background, increased network delays are observed for existing firewall/flow control devices or network security management devices when the matching rule of a rule base for the packet at issue is found lower in hierarchy as all policy rules placed higher in the hierarchy must be evaluated before evaluating those rules at the bottom of the hierarchy.

In order to address certain deficiencies of existing firewall/flow control devices, in an aspect, a network security management device (e.g., firewall/flow control device 108) can be configured to implement systems and methods of the present disclosure and can be configured to optimize security policy rules in real-time based on traffic conditions or when one or more traffic rules within policy rule database 110 are added/edited/deleted/modified. According to one embodiment, network security device 108 can receive a request to add a new traffic flow policy rule to the rules stored in policy rule database 110, based on which firewall/flow control device 108 can be configured to automatically determine dependencies of the new traffic flow policy rule on one or more of the existing policy rules within policy rule database 110 and form an updated set of policy rules based on the determined dependencies. Firewall/flow control device 108 can then automatically optimize the updated set of policy rules grouping one or more policy rules of the updated set of policy rules, reordering one or more policy rules of the updated set of policy rules and/or deleting one or more policy rules of the updated set of policy rules, wherein such optimization of the updated set of policy rules can be performed based on various predetermined or configurable parameters, including, but not limited to, weights assigned to particular types of traffic, preference settings, priority settings, network traffic characteristics and/or network usage statistics for the policy rules of the updated set of policy rules. For example, if redundant rules are found in policy rule database 110 or rules that contradict each other are found in policy rule database 110 the redundancy or conflict can be proactively addressed by deleting one of the redundant or conflicting rules (e.g., manually, automatically or by a combination of manual and automated means).

As discussed in further detail below, in some embodiments, when a policy rule within policy rule database 110 is modified/amended, all other rules that are impacted by the amended rule can be automatically modified or deleted to maintain consistency with the modified rule. Similarly, when two or more rules are identified as being capable of being merged with each other by virtue of having the same source IP addresses, destination IP addresses, a common intended destination/department and/or any other relevant commonality, such rules can be automatically merged in the background or in real-time so as to avoid unnecessary growth in the size and complexity of policy rule database 110. According to one embodiment, validation and optimization functionality can be performed in the background to identify duplicate entries, mergeable entries, shadowed rules and other usual security rule based errors or sub-optimal configurations.

According to another embodiment, firewall/flow control device 108 provides for dynamic reordering of policy rules within policy rule database 110 based on statistical data or weights assigned to one or more policy rules. Such dynamic reordering of the evaluation sequence of policy rules can be based on the most frequently used or the most recently used policy rule(s), for example. Such reordering will facilitate faster decision making by firewall/flow control device 108 as the rules observed to be used most frequently, for example, will be found faster as a result of being placed earlier in the search sequence of policy rule database 110. Typically, the policy rules will be reordered in accordance with administrator-defined criteria; however, in the absence of such criteria embodiments of the present invention may place less specific rules on top or very specific rules on top. Statistical analysis of the application/usage of existing policy rules may be used to select an appropriate default ordering approach.

Further, as security requirements change over time, network administrator and/or security provider may want to add new policy rules, in which case, the network security device 108 or any other network security management device (e.g., a firewall, a gateway, an intrusion prevention device, an intrusion detection device, a server, an integrated security appliance, a switch, a unified threat management (UTM) device, among others, can be configured to use the systems and methods of the present disclosure for creation and modification of firewall/access control policy rules so as to facilitate enhanced computing performance, rule management, policy optimization and/or session/network traffic packet flow management. In an aspect, firewall/flow control device 108 can be configured to use the method of present disclosure so as to overcome the limitation of existing static rule based policy by incorporating dynamic addition/modification of one or more policy rules and to create and optimize the new set of policy rules.

In an aspect, methods of the present disclosure can be used by firewall/flow control device 108 for implementation, execution, and management of policy rules, including but not limited to addition of one or more policy rules, modification of one or more existing policy rules, grouping/merging of one or more existing policy rules, reordering of one or more policy rules, and/or deletion of one or more policy rules in real-time or in the background, without impacting performance of network security device 108. Those skilled in the art will recognize the various purposes of the optimization of flow control policy rules include, but are not limited to, increasing the efficiency of rule scanning/evaluation during packet filtering processing, optimizing storage of policy rule database 110, facilitating management of rules within policy rule database 110 and facilitating fast processing of packets received by firewall/flow control device 108.

According to one embodiment, firewall/flow control device 108 of the present disclosure can also be operatively coupled with a security service/server/software (not show), for example, using secure communications, such as encrypted communication techniques, to store parameters and/or attributes of incoming and outgoing network traffic packets (such as signatures, heuristics, application ID related information, packet attributes, user ID related information, content ID related information, and trusted/untrusted zone information). Based on heuristic/statistical information regarding such parameters and/or attributes, new flow control policy rules may be automatically conceived/generated and added to policy rule database 110. As another example, firewall/flow control device 108 can communicate with the service (e.g., using secure communications, such as encrypted communication techniques) to provide monitored traffic information (e.g., potential malware samples, such as in the form of subsets of such monitored traffic information, such as a portion of the packet flow, monitored Universal Resource Locator (URL)/DNS information, monitored files requested for upload/download/access, and/or other information, along with possibly other information, such as content information for the client device associated with the traffic flow and possibly user identification and/or application identification information as well), and the service can perform additional real-time and or post analysis (e.g., additional heuristic analysis as described herein with respect to various embodiments for detecting malware, including new malware threats and zero-day attacks, and/or to compare to other samples received and analyzed for other customers of the security cloud service).

Figure 2:
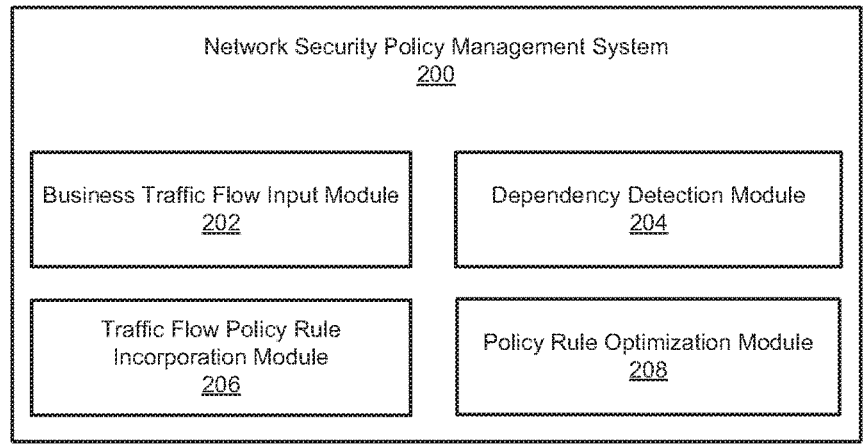
FIG. 2 illustrates exemplary functional units of a rule-based security policy management system in accordance with an embodiment of the present invention.

FIG. 2 illustrates exemplary functional modules of a network security policy management system 200 in accordance with an embodiment of the present disclosure. In the context of the present example, system 200 includes a business traffic flow input module 202, a dependency detection module 204, a traffic flow policy rule incorporation module 206 and a policy rule optimization module 208.

In one embodiment, business traffic flow input module 202 can be configured to receive a request to add a new traffic flow policy rule to a repository of policy rules managed by system 200. Such a request can either be generated automatically or can be manually generated by the user/administrator of the network. In another aspect, business traffic flow input module 202 can also be configured to receive a request relating to modification of an existing stored policy rule, wherein the modification can either be suggested by the administrator or can proposed automatically based on observed traffic patterns (e.g., source/destination IP address patterns), protocols being used, rule hits, types of prevalent attacks, frequency of attacks, changes in organization policy, among other like factors. For example, responsive to observing that one or more policies of a rule base have been unused over a configurable or predetermined period of time, a warning may be provided to the network administrator along with one or more suggested changes to be made to the rule base (e.g., removal or editing of such rules). For example, rules or objects (e.g., addresses or services) that are unused for a long period of time may be recommended for removal or, for performance reasons, the traffic flows containing the unused object may be automatically reordered to place them on the bottom of the security policy. If the unused rules or objects are removed (rather than reordered), in one embodiment, a new security policy optimization is performed.

According to one embodiment, business traffic flow input module 202 can be configured to receive one or more traffic flow policy rules corresponding to a traffic policy control requirement of the business. For example, the enterprise may desire that some traffic be processed faster or given priority over other types of traffic (e.g., a Voice over Internet Protocol (VoIP) provider might choose to have voice sessions be given a higher priority than management sessions). The traffic flow policy rules received by business traffic flow input module 202 may represent new policy rules that needs to be created and added to the policy rule database and can be defined by means of a traffic policy control requirement given as input by a user/administrator. The traffic policy control requirement can be received by a user/administrator in a defined yet flexible format such that the user/administrator may not need to be aware of the already existing policy rules or about the constraints/conflicts that the addition of the new policy rule might create. Adding one or more new policy rules or editing or deleting some preexisting policy rules can have ripple effects on other existing policy rules. As a new policy rule needs to be added and incorporated with the preexisting set of policy rules, automated checks for dependency and shadowing may be implemented by business traffic flow input module 202 or one or more other functional units within system 200.

In another aspect, dependency detection module 204 can be configured to automatically determine dependencies of a new traffic flow policy rule on one or more existing policy rules. In an aspect, dependency detection module 204 can be further configured to evaluate dependence in execution of the new traffic flow policy rule on one or more existing policy rules. In an example implementation, a dependency can be established between policy rules if one policy rule (R1) partially or completely shadows another policy rule (R2) such that execution of rule R1 directly or indirectly impacts the rule R2. According to one embodiment, two rules are dependent if they mutually exhibit a precedence relationship. Such a dependency may not necessarily be detrimental or contradictory to the execution of rule R1, but may overlap with and/or depend on R2. For instance, rules R1 and R2 may be dependent on each other when they are not disjoint such that R2 cannot be moved before R1 without violating semantic integrity of the rule set. Dependency detection module 204 can therefore be configured to detect whether the newly proposed policy rule (one or more traffic flow policy rules) depends, for its execution, on any preexisting policy rule, so as to understand relationships between the newly proposed policy rule and the stored policy rules.

In another instance of dependency detection, consider two rules as follows: rule 1 permits packets with characteristic A (source address, for example) and rule 2 denies packets with characteristic B (destination address, for example). A packet with a profile matching both characteristics (from A to B in this case) will match both rules. In such a case therefore, the rules are dependent. In an aspect, dependency can be determined by means of multiple methods. For example, a rule can be selected, e.g., rule 1, for determining whether other rules in a policy rule database (e.g., policy rule database 110) depend on it. In selecting the rule, match types and associated values that would be used to filter packets can be identified, wherein match types are characteristics of packets that are used for comparison to a rule. Packet characteristics can include, for example, the protocol, port, originating IP address, destination IP address, etc. For example, a match type may be "protocol" and the value is "TCP." The rule might also have a match type "port" with a value of "20." The rule might also have a match type "IP" with a value of "123.45.67.89." One of ordinary skill in the art will recognize that a match type may be any characteristic associated with the profile of a packet. A second rule, e.g., rule 2, may then be selected for comparison to rule 1. In selecting the second rule, again match types and associated values that would be used to filter packets may be identified for that rule. The match types of rule 1 can then be compared to rule 2 such that if rule 1 and rule 2 have at least one of the same match types, the values of each of the match types of rule 1 and rule 2 are compared. If all of the match types have different values than their corresponding match types in rule 2, rule 1 and rule 2 may be determined to be order independent. If rule 1 and rule 2 have at least one match type that is not in common, or if at least one match type of rule 1 shares the same value as the corresponding match type in rule 2, or if at least one of the match type of rule 1 is included (e.g., IP address and subnet) on the corresponding match type in rule 2, or if at least one of the match type of rule 2 is included (e.g., IP address and subnet) on the corresponding match type in rule 1, rule 1 and rule 2 may be determined to be order dependent. This background process can be repeated until each pair of rules has been compared.

In another aspect, traffic flow policy rule incorporation module 206 can be configured to form an updated set of policy rules by incorporating the new traffic flow policy rule within the policy rules based on the determined dependencies, if any. In an implementation, traffic flow policy rule incorporation module 206 can either be configured to simply incorporate the new traffic flow policy rule into the policy database and leave the dependencies to be evaluated and handled later, or it can be configured to handle the dependencies and accordingly add or remove one or more existing traffic flow policy rules to/from the policy rules database. For instance, the position at which a new traffic flow policy rule is added to the database and the level at which it would be executed can be based on the dependencies computed by dependency detection module 204. Furthermore, an order of the new rule in the existing repository of flow control policy rules can also be accounted for while forming the updated set of policy rules. In an exemplary implementation, when the new rule is found to be dependent on another rule stored in the repository, both the rules can be assigned the same equivalence class.

In another aspect, policy rule optimization module 208 can be configured to automatically optimize the updated set of policy rules by grouping a first sub-set of policy rules of the updated set of policy rules, reordering a second sub-set of policy rules of the updated set of policy rules and/or deleting a third sub-set of policy rules of the updated set of policy rules based on weights assigned to particular types of traffic, preference settings, priority settings, network traffic characteristics and/or network usage statistics for the policy rules of the updated set of policy rules.

According to one embodiment, grouping policy rules includes identifying potentially combinable policy rules associated with similar allowed flows (e.g., only different sources, only different destinations or only different services) and merging the identified combinable policy rules into a single policy rule. The merging can also be conducted based on matching of source IP addresses, destination IP addresses, services, applications, interfaces, rule tags, priorities and/or parameters of the policy rules. In some embodiment, identifying potential combinable policy rules can be based on IP supernetting of the source IP addresses and/or the destination IP addresses. For example, a first traffic flow from source 192.168.0.0/24 to destination 1.1.1.1:80 and a second flow from source 192.168.1.0/24 to destination 1.1.1.1:80 can be merged into a new flow from source 192.168.0.0/25 to destination 1.1.1.1:80. In an instance, multiple parameters of the rule space, including, but not limited to, source, destination, user, service, enterprise firewall ID, and other such parameters can be used to identify rules that may interact or be combinable.

As a specific non-limiting example for purposes of illustration, assume there are three FTP rules that are candidates for combination, including rules allowing FTP traffic from trusted sources trusted.com and reliableco.com. In various embodiments, these trusted sources would be identified by an IP address or an IP address range. In the context of the present example, rules for both trusted sources allow FTP traffic, but require a virus scan to be performed. A third rule allows FTP traffic from all other sources except for "put" functions that may be used to upload a file. This rule allows unknown sources to log on and download, but not upload, files. As such, no antivirus scan is required for the third rule. While it is evident that the first two rules can be easily combined as they are identical except for a single parameter that does not overlap or interact in identifying two different connection sources, the third rule is distinctly different.

Further, the order of the third rule is important, as the rule should be processed only after the first two rules, so that the trusted sources are allowed to FTP and "put" files to the servers protected by the firewall. Adding the third rule to the other two to form a combined rule or otherwise modifying the first two rules based on the third will result in firewall behavior not intended by the administrator for at least some connections. In this example, it may be acceptable to allow FTP access including upload capability for all users, requiring anti-virus scanning for uploads only. The administrator may deem this a reasonable risk to take, or may decide the change to rule set functionality is unacceptable and only allow combination of the first two rules while declining to allow the third rule to be combined with the first two. In an aspect, whether two or more rules can be grouped/merged is determined by examining whether the rules at issue differ in relation to only a single parameter (e.g., source, destination, service), in which case, they are identified as capable of being grouped/merged. In another aspect, whenever possible, rules are grouped by superneting. If two rules differ in two or more elements/parameters, they may be grouped/reordered in such a way that results in more hits in one of the generated rules. Meanwhile, if the scope of one rule is contained entirely by the scope of another rule, the narrower rule may be deleted and the broader rule may be retained.

In an example implementation, merging of policy rules can be implemented based on superneting of one or more of the source IP addresses and the destination IP addresses, i.e. applying a single policy rule for IP addresses belonging to same class of IP addresses. In an example implementation, one or more parameters can be used to determine the group-able/merge-able policy rules. For example, if two rules differ in just one element (e.g., source, destination, service), they can be grouped together. Similarly, the policy rules applied for a group of network elements can be grouped by superneting. In an example implementation, when the scope of one policy rule is "contained" in another policy rule or all the security checks of the one policy one rule are covered by a broader security rule, then both rules can be merged into the policy rule having broader scope.

Those skilled in the art will appreciate that policy rule optimization module 208 can also be configured to demerge one or more rules to make them separate in case their order, for instance, plays an important role in deciding how the traffic packets are to be processed, and therefore, although the functions of deletion, grouping, and re-ordering have been mentioned above, any other function that enables optimization of the updated set of rules is completely within the scope of the present disclosure.

According to one embodiment, reordering of policy rules can include changing an order of policy rules based on their respective source IP addresses, destination IP addresses, network usage statistics, applications, interfaces, rule tags, priorities and/or parameters. In an example implementation, the order of policy rules may be changed based on frequency of past usage, a manual priority set according to the business needs and/or other predefined or dynamically determined criteria. For example, a policy rule that is observed to be used the most frequently can be reordered to be executed first. In an example implementation, a dynamic priority can be assigned to each policy rule and the order of execution can therefore be dynamically changed. In an example implementation, if one policy rules is dependent upon another, then their relative order of execution will be preserved.

According to one embodiment, deletion of a policy rule or recommendation of deletion of a policy rule to the administrator is as a result of identifying one or more conflicts among policy rules. Conflicts include, but are not limited to, existence of a duplicate policy rule and existence of a policy rule that is contrary to a new traffic flow policy rule, for example. According to one embodiment, new rules may subsume or negate previous rules, or conflicting rules may be present in the rule set. Depending upon the particular implementation, optimization module 208 can be configured to simply bring to the attention of the administration policy rules that have been identified to be in conflict so that the administrator can select which of the rules to apply, what order the rules should be applied, or whether to merge the rules into a single rule if appropriate. In an alternative embodiment, optimization module 208 may implement changes to the policy rule database and maintain a log of changes to allow an administrator to selectively undo certain optimizations and/or revert to a prior state of the policy rule database if desired. When statistical data (e.g., frequency of execution during one or more particular time frames) is tracked and maintained relating to execution of policy rules, optimization module 208 may provide a warning to the administrator regarding any unused policies, suggest changes (e.g., removal, editing or reordering of an unused policy) and/or automatically implement and log changes to the policy rule database deemed to be appropriate.

Depending upon the particular implementation, the updated set of policy rules may be defined dynamically based on the scope and attributes of policy rules and weights assigned to particular types of traffic, preference settings, priority settings, network traffic characteristics, and/or network usage statistics based on automatic or manual criteria, at any given time, with or without administrator intervention. In an aspect, assignment of weights to types of traffic can be conducted manually or automatically or a combination thereof based on scope and/or attributes of the policy rule. In an example implementation, each policy rule can be assigned a dynamic priority/weight for its hierarchical execution. While reordering policy rules, dynamic priority can be used to define the execution order of policy rules. Policy rules can be executed in hierarchical/sequential manner according to their priority such that policy rules with highest priority is executed before execution of policy rules of comparatively lower priority. The priority can be assigned by the user/administrator or can be automatically determined based on statistical and/or historical data regarding the actual use of the policy rules. In an example implementation, an updated set of policy rules can be executed in parallel or in sequence based on the one or more weights assigned, the preference settings, the priority settings for the policy rules, network traffic characteristics, and network usage statistics, among other attributes/parameters.

Depending upon the particular implementation, network security policy management system 200 may be implemented separately from or integrated within a network security device, for example, comprising one or more processors, a communication interface mechanism, one or more internal data storage devices operatively coupled to the one or more processors and storing policy rule optimization module 208 configured to retrieve a set of policy rules and optimize the retrieved set of policy rules.

According to one embodiment, policy rule optimization module 208 can also be configured to run on a periodic basis or when one or more optimization parameters are defined/modified so as to ensure that at any given moment, the policy rules are optimally ordered, grouped and managed. Policy rule optimization module 208 may also or alternatively be manually initiated by the network administrator or automatically initiated upon detection of one of a set of predefined events (e.g., a change to the policy rule database or a change to defined business flows, expressing the relative priorities of various types of traffic within the enterprise, for example).

In an example implementation, network security policy management system 200 can have a front end interface module (not shown) that can be used by user/administrator to create and/or upload one or more new security policy rules. Other modules of the present system can run in the background for validation and optimization of updated policy rules that would identify duplicate entries, mergeable entries, shadowed rules and other usual security rule based errors or non-optimized configurations. Optimization module 208 can, periodically or dynamically or based on user-defined actions, create an optimized version of the policy rules that would effectively reduce the size of the actual security policy being executed by the firewall/flow control device/network security management device. For example, the network security device may calculate whether the creation of one or more explicit denied flows might be advantageous in connection with reducing the security policy size. In an exemplary embodiment, policy rule optimization module 208 can also reorder security policies based on customer business drivers, thereby reducing the initial rule matching time for network traffic so as to increase the performance of the security system based on automatic and/or user defined criteria. Thus, flow control policy rules can be reordered and/or rebuilt/modified dynamically based on automatic and/or manual criteria at any given time, with or without user intervention.

In an exemplary implementation, proposed changes to the policy rule database may be brought to the attention of the user/administrator via the frontend interface for further modification and/or confirmation before taking affect. Alternatively, confirmation of optimized policy rules may not require to be confirmed/approved by any user/administrator prior to being implemented and taking affect.

In accordance with embodiments of the present invention, creation and/or ordering of optimized policy rules can be based on various criteria, including, but not limited to, performance (e.g., rule hits), business flows (e.g., to guarantee one or more types traffic are processed faster) and/or statistical analysis of the actual policy rules being used. The security policy can also self-adjust automatically over time in order to improve performance and further reduce delay for new session establishment.

In an exemplary implementation, network security policy management system 200 may generate a warning if a rule remains unused over a predetermined or configurable period of time. Network security policy management system 200 may alternatively or additionally suggest re-ordering of rules within the policy rule database (e.g., moving unused or infrequently used rules to the end) or removal of unused rules. Network security policy management system 200 can also be configured to simplify management of policy rules so as to allow the administrator to focus his/her attention on traffic flows that reflect particular business needs. For example, because network security policy management system 200 will take care of evaluating and creating a valid, effective, efficient and optimized security policy, the administrator no longer needs to check the complete rule base before making any changes. In an aspect, higher priority rules can also be identified and re-ordered and/or categorized in order to optimize packet filtering. In another embodiment, priorities of optimization parameters (e.g., network traffic characteristics, source/destination IP addresses, frequency/time aspects of packets, type of traffic, among others) can also be configured/changed based on usage/context/organization policies/objectives. For example, some enterprises may value (and therefore prioritize) increased performance in initial session establishment (e.g., as a result of reordering of rules based on frequency of execution or based on whether they specify one or more specific IP addresses or are subnet based) over a more compact rule set (e.g., as a result of merging rules).

FIG. 3A illustrates an exemplary representation 300 showing a snapshot of a simplified security policy, and FIG. 3B shows addition of a new security policy rule 399 to the security policy in accordance with an embodiment of the present disclosure. In the present example, representation 300, includes a Host/Network column 310, identify the source host/network(s) with which the policy rule is associated, a Peer Host/Network column, identifying the destination/target peer host/network(s) with which the policy rule is associated, a Ports column 330, identifying particular ports on which the traffic is allowed, a Business Case/tag column 340, identifying a project with which the corresponding policy rule is associated, and a rule ID/seq column 350, potentially indicating an order in which the policy rules are applied. Those skilled in the art will appreciate the exemplary functional modules described herein are for purposes of illustration only and that the functionality described with reference to various of the exemplary functional modules may be combined and/or distributed differently.

FIG. 3A illustrates a simplified example of preexisting flow control security policy rules having rule identifiers (IDs) 350 ranging from 1 to 15 and representing different policy rules that are defined/configured by the user/administrator/system in order to filter incoming/outgoing traffic/packet/connection requests from/to the network. Rule IDs 350 can also indicate the sequence in which the processing of the network traffic takes place, wherein the traffic would first pass through the entries/flows associated with sequence ID 1 and then to 2 and so on. As can be seen, each rule ID 1-15 can be implemented for one or more projects that correspond to respective business cases/tags 340. Each project can also be associated with multiple sessions between source host and destination/peer host.

As can be seen in the present example, entry 301a of policy rule 301 relates to all traffic/packet/connection requests sent from host 10.184.17.0/26 to peer host/network 10.135.32.0/26, which, can be sent on any of the ports, wherein the interaction between the source-destination relates to a project referred to as "Initial Project." Similarly, in accordance with entry 303a of policy rule 303, traffic can be sent from buss-server02 to 10.135.35.121 on ports 3315/TCP, 3380/TCP, 3366/UDP, and 3390/TCP. While representation 300 FIG. 3A only shows twenty-one entries representing twelve policy rules, those skilled in the art will appreciate, in practice, there can be hundreds of such entries.

FIG. 3B illustrates a new rule 399 created by user/administrator, which needs to be incorporated with the existing policy rules of FIG. 3A. New rule 399 may be used for traffic analysis and monitoring of traffic flow, for example, between buss-fe01 and 10.135.35.0/24 through port TCP-1024. Prior to incorporation of new rule 399 into the existing policy rules, various initial checks may be performed to identify policy rules within the existing policy rule database upon which new rule 303 may be dependent, identify duplicate/overlapping/dependent/shadowing rules and/or determine the relative priority of new rule 399, based on which new rule 399 can be incorporated into the policy rule database. Since the project ("Web-API-Integration") with which new rule 399 is associated is business critical, it will be given high priority which should be reflected during reordering of the policy rules.

If the flow represented by new rule 399 is expected to have many sessions and in view of its high priority, the administrator, without the benefit of performing a detailed analysis of the security policy, may manually create the following flawed security rule entry on top of the security policy represented in FIG. 3A:

| Host/<br>Network | Peer<br>Host/Network | Ports | Business Case/tag | rule ID/<br>seq |
|---|---|---|---|---|
| buss-fe01 | 10.135.35.0/24 | TCP-1024 | web_API integration | 1 |

In existing systems, with the insertion of this new rule, the sequence numbers of subsequent rules would be incremented by one. With this change, the newly defined traffic flow would have the highest priority in relation to new session matching processing, but the security policy may effectively shadow part of rule 305, and allow traffic that should be denied by rule 311, thus creating unnecessary processing on rule 305 and allowing a traffic flow that should have been denied by rule 311. Since traffic meeting rule 311 (which should be denied) is allowed in accordance with the present example, it is unlikely anyone would complain (as end users typically only notice the denial of traffic they desire to be allowed), but a security issue has been created by the introduction of a flawed security rule.

In accordance with embodiments of the present invention, on the other hand, without analyzing the security policy, the administrator can instruct the security system to create a flow with the characteristics of new rule 399 without concern as network security policy management system 200 would automatically evaluate the existing security policy and reach the following conclusions:
   a. Since the priority associated with new rule 399 is high, new rule 399 needs to be placed on top;
   b. Rule 305 also matches this flow for traffic originating on host buss-fe01. If a new rule is created on top, then part of rule 305 is unnecessary, so rule 305 should be automatically revised; and
   c. Rule 311 is in conflict with part of the flow required for new rule 399. Since rule 311 is a deny rule, a warning should be issued to the administrator pointing out the conflict; and
      i. If the flow-denial of rule 311 is to be maintained, rule 311 should be moved to a position with a smaller seq# than new flow 399. Alternatively, if rule 311 is to be "forgotten" due to the higher priority of new flow 399, then rule 311 should be removed.

Figure 4:
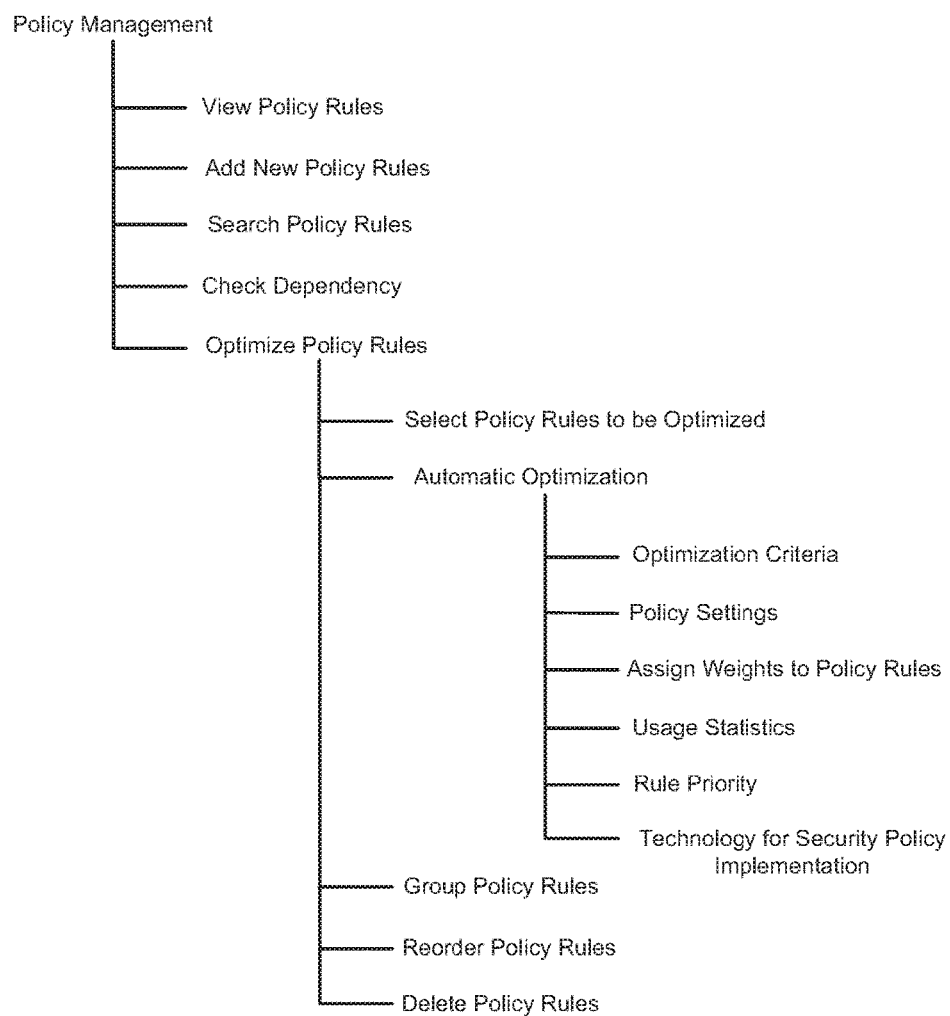
FIG. 4 illustrates an exemplary snapshot of a security policy rule management system in accordance with an embodiment of the present invention.

FIG. 4 illustrates an exemplary snapshot of a security policy rule management system interface 400 in accordance with an embodiment of the present invention. The snapshot 400 illustrates an exemplary frontend/administrator interface for management of security policy rules. According to one embodiment, system interface 400 can present a user/administrator with various options for managing one or more policy rules including, but not limited to, viewing policy rules, adding new policy rules, searching for policy rules, checking dependencies of one or more rules, deleting/modifying/re-ordering and optimizing policy rules. In an aspect, a user/administrator, by means of viewing policy rules, can also add new policy rules to the existing set of flow control policy rules, analyze performance of current rules, view traffic pattern/attributes/characteristics, and manage conflicts/modification of rules. In another aspect, the administrator can also check dependency in order to view automatically identified dependencies that any rule has on the other set of rules that form part of the rules repository. In yet another aspect, based on a selected optimization criteria (e.g., optimization based on priority verses optimization based on traffic statistics) dependencies, traffic related attributes, weights of different types of policy rules, organizational policies, among other parameters, the administrator can also enable optimization of the policy rules.

In yet another embodiment, as shown in FIG. 4, optimization can either take place for all the flow control policy rules or can be performed automatically for a defined number interlinked/selected/related rules. In yet another embodiment, through the "optimize policy rules" option, the administrator can also select and/or define criteria to be used for optimization, define policy settings to be adopted for optimization, assign weights to different policy rules, enable usage statistics to be incorporated during optimization, define priority of one or more rules, enable traffic attributes/characteristics to be incorporated along with the defining, say the technology required for security policy implementation.

In yet another embodiment, through the "optimize policy rules" option a user/administrator can select and define group policy rules through which the system can either through manual intervention or automatically, arrange new and/or existing policy rules into groups. Such an option can allow automatic merging of possible flow control policy rules or creating of new rules that relate to subnets and not to individual IP addresses, for instance.

In yet another embodiment, through the "optimize policy rules" option, the administrator can enable all or part of the policy rules to be re-ordered, leading to, for instance, higher priority rules or more frequently referred rules to be brought up the hierarchy for faster access when compared with lower priority rules. Any other basis such as most accessed rules can also be applied for re-ordering or re-arranging one or more policy rules. In yet another embodiment, through the "optimize policy rules" option a user/administrator can enable deletion of one or more rules based on, for instance, duplicate/redundant rules, conflicting rules (that act differently for same source-destination packet for instance). One should appreciate that the various options illustrated through security policy rule management system interface 400 are completely exemplary in nature and all other options for management of policy rules are within the scope of present disclosure.

FIG. 5A, FIG. 5B and FIG. 5C illustrate exemplary policy rules 500 stored in a policy rule database along with dependencies and possible groupings detected in accordance with an embodiment of the present invention. FIG. 5A illustrates an exemplary representation 500 having multiple policy rules, specifying actions to be taken by a network security device for specific services between specific sources and specific destinations. For instance, as can be seen, traffic from 192.168.0.0/24 to any destination is allowed for Domain Name System (DNS), HyperText Transfer Protocol (HTTP), and HTTP Secure (HTTPS) packets and the priority of such packets is Normal. The exemplary representation 500 of FIG. 5A also shows, for instance, the number of sessions impacted by each policy rule over a given time period and the corresponding percentage of sessions of the total number of sessions during the given time period.

FIG. 5B illustrates the policy rules 500 of FIG. 5A with a "Dependencies" column annotating various automatically identified dependencies among the policy rules 500. For instance, as the policy rule at index 7 blocks any traffic from 192.168.3.2 to 192.168.0.0/16, the execution order of the policy rule at index 6 rule depends on the policy rule of index 7. Similarly, as the policy rule of index 8 applies to all traffic from 192.168.3.2 to any destination, the policy rule at index 7 shadows the policy rule at index 8.

FIG. 5C illustrates how potential policy rules that can be merged/grouped can be identified and represented. For instance, the column "Dependencies B" includes annotations indicating that the policy rule at index 1 and the policy rule at index 2 rule can be partially merged together as they have the same source-destination pairs/priority and only differ in the type of service they allow to pass, and therefore, if merged, they can allow a combined traffic for DNS, HTTP, HTTPS, and SMTP. Similarly, the policy rule at index 8 can also be partially merged with the policy rule at index 2, wherein post merger, the priority of the policy rule at index 2 can either be set to High or can be kept at Normal as specified manually by the administrator or determined automatically based on one or more of the weight of each rule, traffic characteristics, among other defined set of parameters.

FIG. 5D illustrates an optimized version of the security policy that seeks to optimize performance based on traffic statistics gathered by the flow control device in accordance with an embodiment of the present disclosure. As shown, the updated policy rule set has a policy rule at index 1 resulting from a partial merger of former policy rules associated with index 1 and index 2 of FIG. 5C, with the source being 192.168.0.0/23 and allowing issuance of packets to all destinations using DNS, HTTP and/or HTTPS services. The representation of FIG. 5D further shows the former policy rule associated with index 6 having been reordered to now be associated with index 2, and the former policy rule associated with index 7 being reordered to now be associated with index 3 as the volume of hits for this policy rule 3 are relatively high (50000 sessions). Similarly, a new policy rule associated with index 4 is a partial merger of the former policy rule associated with index 2 and the former policy rule associated with index 8, and a new policy rule at index 5 represents a reordered version of the former policy rule associated with index 4. Likewise, policy rule at index 7 has been put toward the end as the number of sessions/hits for this transaction (192.168.3.1 to 192.168.1.80 over HTTP) is low.

FIG. 5E illustrates an alternative optimized version of the security policy that seeks to optimize performance based on administrator-defined traffic priority in accordance with an embodiment of the present disclosure. As shown, the optimized policy rule set reflects, among other things, movement of former policy rule associated with index 6 in FIG. 5C to index 2. As former policy rule associated with index 7 in FIG. 5C had a high number of hits/sessions, that former policy rule has been moved to index 3, and the new policy rule at index 4 represents the partial merger of former policy rules associated with index 2 and 8 in FIG. 5C.

Those skilled in the art will appreciate that the two previously described optimization scenarios are merely exemplary and are based on a defined set of administrator-defined and/or system maintained parameters. In alternative embodiments, policy rules may be selected and evaluated with respect to their hits/session/frequency of use, potential of merger to reduce the overall number of rules and/or potential for making the database light and efficient, along with considering other parameters discussed above to reorder the rule database.

Figure 6:
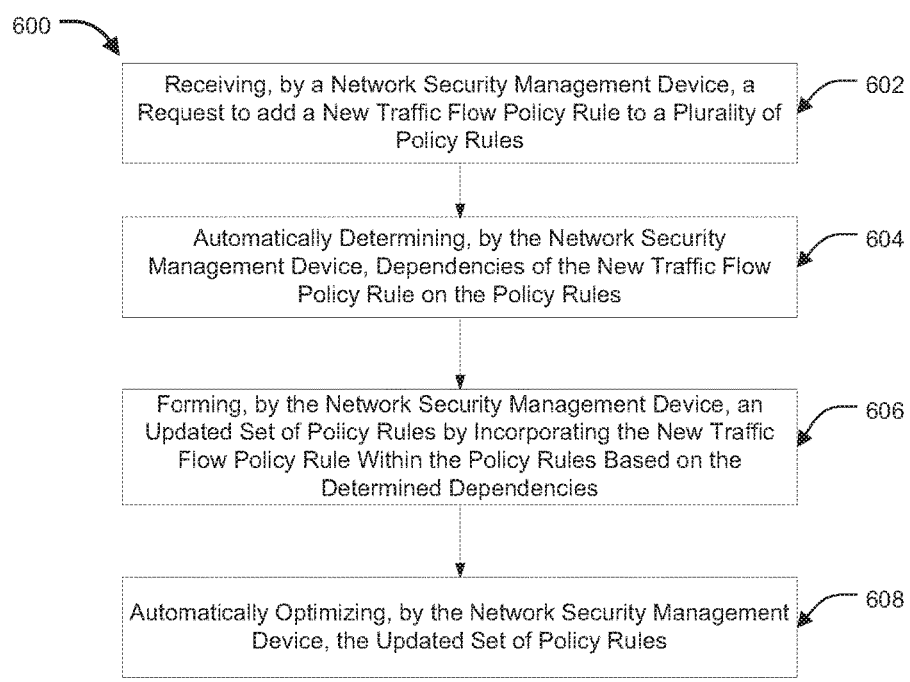
FIG. 6 is a flow diagram illustrating security policy rule management in accordance with an embodiment of the present invention.

FIG. 6 illustrates an exemplary flow diagram 600 for optimization of policy rules in a rule database in accordance with an embodiment of the present disclosure. At step 602, a network security management device receives a request to add a new traffic flow policy rule to an existing set of policy rules. In an aspect, such a request can either be manually generated by say a user/administrator or can be automatically generated based on traffic pattern/characteristics, network usage statistics, user activities, among other like actions.

At step 604, upon receipt of the request to add the new traffic flow policy rule, the network security management device automatically determines dependencies of the new traffic flow policy rule in relation to one or more of the existing policy rules. At step 606, an updated set of policy rules based on the determined dependencies can be created/generated, and at step 608, the updated set of policy rules can be automatically optimized by one or more of grouping a first sub-set of policy rules of the updated set of policy rules, reordering a second sub-set of policy rules of the updated set of policy rules, and deleting a third sub-set of policy rules of the updated set of policy rules, wherein such optimization of the updated set of policy rules can be performed based on one or more of weights assigned to particular types of traffic, preference settings, priority settings, network traffic characteristics, and network usage statistics for the policy rules of the updated set of policy rules.

According to one embodiment, dependencies can be determined by means of evaluation of dependence in execution of the new traffic flow policy rule on one or more policy rules. In another aspect, grouping of the first sub-set of policy rules of the updated set of policy rules can include merging combinable policy rules of the first sub-set of policy rules into a single policy rule, wherein the merging can be conducted based on matching of one or more of source Internet Protocol (IP) addresses, destination (IP) addresses, services, applications, interfaces, rule tags, priorities, and parameters of the combinable policy rules. According to another embodiment, merging of the combinable policy rules can be conducted based on superneting of one or more of the source IP addresses and the destination IP addresses.

According to another embodiment, reordering a second sub-set of policy rules can include changing an order of policy rules of the second sub-set of policy rules based on one or more of their source IP addresses, destination IP addresses, network usage statistics, applications, interfaces, rule tags, priorities, and parameters. According to one embodiment, order of the policy rules of the second sub-set of policy rules can be changed based on frequency of usage thereof.

According to another embodiment, deleting a third sub-set of policy rules can include deleting policy rules of the third sub-set of policy rules based on one or more conflicts between policy rules of the third sub-set of policy rules and the updated set of policy rules. In an exemplary embodiment, the one or more conflicts can include existence of a duplicate policy rule in the policy rules of the third sub-set of policy rules and the updated set of policy rules. One or more conflicts can also include one or more policy rules of the updated set of policy rules that are contrary to the new traffic flow policy rule.

According to one embodiment, weights assigned to types of traffic can be defined manually based on scope and attributes of policy rule or can be defined automatically. According to another embodiment, formation of the updated set of policy rules can be conducted/performed based on the one or more weights, the preference settings, the priority settings for the policy rules, network traffic characteristics, and network usage statistics.

Figure 7:
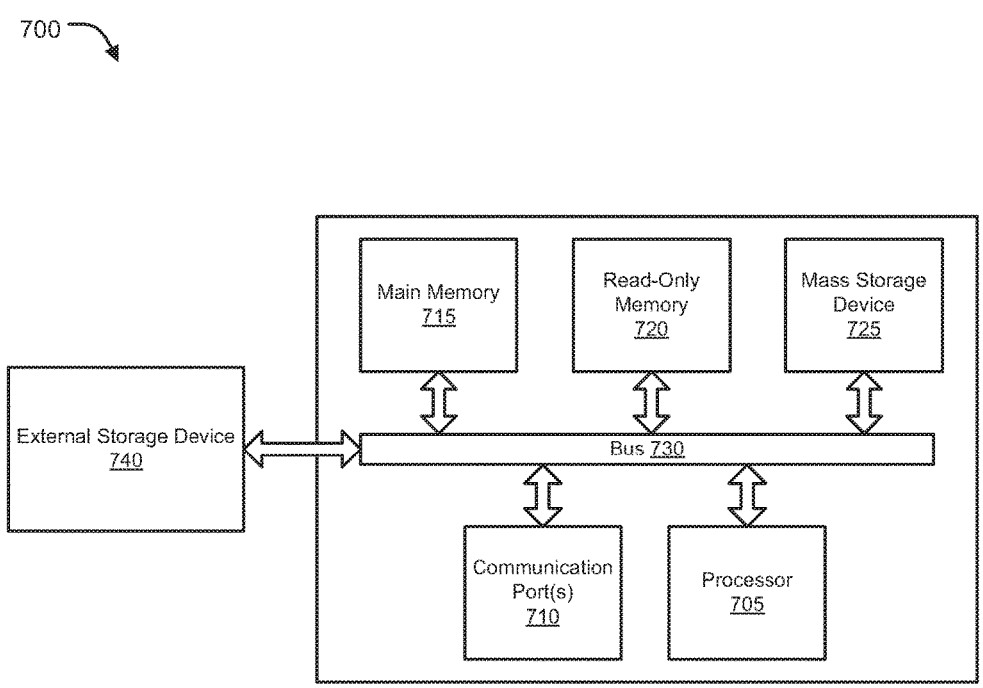
FIG. 7 is an exemplary computer system in which or with which embodiments of the present invention may be utilized.

FIG. 7 is an example of a computer system 700 with which embodiments of the present disclosure may be utilized. Computer system 700 may represent or form a part of a network security management device (e.g., a firewall, a gateway, an intrusion prevention device, an intrusion detection device, a server, an integrated security appliance, a switch, a unified threat management (UTM) device) or other device implementing one or more components of a network security policy management system (e.g., network security policy management system 200).

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 700 includes a bus 730, a processor 705, communication port 710, a main memory 715, a removable storage media 740, a read only memory 720 and a mass storage 725. A person skilled in the art will appreciate that computer system 700 may include more than one processor and communication ports.

Examples of processor 705 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 705 may include various modules associated with monitoring unit as described in FIGS. 2-4. Communication port 710 can be any of an RS-232 port for use with a modem based dialup connection, a 10/100 Ethernet port, a Gigabit or 10 Gigabit port using copper or fiber, a serial port, a parallel port, or other existing or future ports. Communication port 710 may be chosen depending on a network, such a Local Area Network (LAN), Wide Area Network (WAN), a WLAN or any network to which computer system 700 connects.

Memory 715 can be Random Access Memory (RAM), or any other dynamic storage device commonly known in the art. Read only memory 720 can be any static storage device(s) such as, but not limited to, a Programmable Read Only Memory (PROM) chips for storing static information such as start-up or BIOS instructions for processor 705.

Mass storage 725 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 730 communicatively couples processor(s) 705 with the other memory, storage and communication blocks. Bus 730 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 705 to system memory.

Optionally, operator and administrative interfaces, such as a display, keyboard, and a cursor control device, may also be coupled to bus 730 to support direct operator interaction with computer system 700. Other operator and administrative interfaces can be provided through network connections connected through communication port 710.

Removable storage media 740 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A method comprising:
receiving, by a network security management device, a request to add a new traffic flow policy rule to a plurality of policy rules managed by the network security management device;
automatically determining, by the network security management device, dependencies of the new traffic flow policy rule on one or more of the plurality of policy rules;
forming, by the network security management device, an updated set of policy rules by incorporating the new traffic flow policy rule within the plurality of policy rules based on the determined dependencies; and
automatically optimizing, by the network security management device, the updated set of policy rules by grouping a first sub-set of policy rules of the updated set of policy rules, reordering a second sub-set of policy rules of the updated set of policy rules, and deleting a third sub-set of policy rules of the updated set of policy rules, wherein the optimizing is based on one or more of weights assigned to particular types of traffic, preference settings, priority settings, network traffic characteristics and usage statistics for each policy rule of the updated set of policy rules, wherein the optimizing by the network security management device is performed in real time, wherein the network security management device is configured to maintain a log of changes to the policy rules enabling the optimizing to be undone.

2. The method of claim 1, wherein said determining dependencies comprises evaluating dependence in execution of the new traffic flow policy rule on one or more of the plurality of policy rules.

3. The method of claim 1, wherein said grouping the first sub-set of policy rules of the updated set of policy rules comprises merging combinable policy rules of the first sub-set of policy rules into a single policy rule, wherein the merging is conducted based on matching of one or more of source Internet Protocol (IP) addresses, destination IP addresses, services, applications, interfaces, rule tags, priorities, and parameters of the combinable policy rules, and wherein the network security management device is configured to demerge at least some of the merged policy rule from the single policy rule.

4. The method of claim 3, wherein the merging of combinable policy rules is conducted based on superneting of one or more of the source IP addresses and the destination IP addresses.

5. The method of claim 1, wherein said reordering the second sub-set of policy rules comprises changing an order of policy rules of the second sub-set of policy rules based on one or more of their source IP addresses, destination IP addresses, network usage statistics, applications, interfaces, rule tags, priorities, and parameters.

6. The method of claim 5, wherein the order of the policy rules of the second sub-set of policy rules is changed based on frequency of usage thereof.

7. The method of claim 1, wherein said deleting the third sub-set of policy rules comprises deleting policy rules of the third sub-set of policy rules based on one or more conflicts between policy rules of the third sub-set of policy rules and the updated set of policy rules.

8. The method of claim 7, wherein the one or more conflicts include existence of a duplicate policy rule in the policy rules of the third sub-set of policy rules and the updated set of policy rules.

9. The method of claim 7, wherein the one or more conflicts include one or more policy rules of the updated set of policy rules that are contrary to the new traffic flow policy rule.

10. The method of claim 1, wherein the one or more weights are defined manually based on scope and attributes of policy rule.

11. The method of claim 1, wherein the one or more weights are defined automatically.

12. The method of claim 1, wherein said forming an updated set of policy rules is conducted based on the one or more weights, the preference settings, the priority settings for the policy rules, network traffic characteristics, and network usage statistics.

13. A network security policy management system comprising:
one or more processors; and
one or more internal data storage devices operatively coupled to the one or more processors and storing:
a business traffic flow input module configured to receive a request to add a new traffic flow policy rule to a plurality of policy rules managed by the system;
a dependency detection module configured to automatically determine dependencies of the new traffic flow policy rule on one or more of the plurality of policy rules;
a traffic flow policy rule incorporation module configured to form an updated set of policy rules by incorporating the new traffic flow policy rule within the plurality of policy rules based on the determined dependencies; and
a policy rule optimization module configured to automatically optimize the updated set of policy rules by grouping a first sub-set of policy rules of the updated set of policy rules, reordering a second sub-set of policy rules of the updated set of policy rules, and deleting a third sub-set of policy rules of the updated set of policy rules, wherein the optimizing is performed in real-time based on one or more weights assigned to particular types of traffic, preference settings, priority settings, network traffic characteristics, and network usage statistics for the policy rules of the updated set of policy rules, and wherein the policy rule optimization module is configured to maintain a log of changes to the policy rules enabling the optimizing to be undone.

14. The system of claim 13, wherein the dependency detection module is further configured to evaluate dependence in execution of the new traffic flow policy rule on one or more of the plurality of policy rules.

15. The system of claim 13, wherein said grouping the first sub-set of policy rules of the updated set of policy rules comprises merging combinable policy rules of the first sub-set of policy rules into a single policy rule, wherein the merging is conducted based on matching of one or more of source IP addresses, destination IP addresses, services, applications, interfaces, rule tags, priorities, and parameters of the combinable policy rules.

16. The system of claim 15, wherein the merging of combinable policy rules is conducted based on superneting of one or more of the source Internet Protocol (IP) addresses and the destination IP addresses.

17. The system of claim 13, wherein said reordering the second sub-set of policy rules comprises changing an order of policy rules of the second sub-set of policy rules based on one or more of their source IP addresses, destination IP addresses, network usage statistics, applications, interfaces, rule tags, priorities, and parameters.

18. The system of claim 13, wherein said deleting the third sub-set of policy rules comprises deleting the policy rules of the third sub-set of policy rules based on one or more conflicts between policy rules of the third sub-set of policy rules and the updated set of policy rules.

19. The system of claim 18, wherein the one or more conflicts include existence of a duplicate policy rule in the policy rules of the third sub-set of policy rules and the updated set of policy rules.

20. The system of claim 18, wherein the one or more conflicts comprise one or more policy rules of the updated set of policy rules that are contrary to the new traffic flow policy rule.

21. The system of claim 13, wherein the one or more weights are defined manually based on scope and attributes of the policy rule.

22. The system of claim 13, wherein the one or more weights are defined automatically.

23. A network security policy management system comprising:
one or more processors; and
one or more internal data storage devices operatively coupled to the one or more processors and storing a policy rule optimization module configured to retrieve information regarding a current set of policy rules and optimize the current set of policy rules by grouping a first sub-set of policy rules of the current set of policy rules, reordering a second sub-set of policy rules of the current set of policy rules, and deleting a third sub-set of policy rules of the current set of policy rules, wherein the optimizing is performed in real-time based on one or more of weights assigned to particular types of traffic, preference settings, priority settings, network traffic characteristics, and usage statistics for each policy rule of the current set of policy rules, wherein the policy rule optimization module is configured to maintain a log of changes to the policy rules enabling the optimizing to be undone.

24. The system of claim 23, wherein said grouping the first sub-set of policy rules comprises merging combinable policy rules of the first sub-set of policy rules into a single policy rule, wherein the merging is conducted based on matching of one or more of source IP addresses, destination IP addresses, services, applications, interfaces, rule tags, priorities, and parameters of the combinable policy rules.

25. The system of claim 23, wherein said reordering the second sub-set of policy rules comprises changing an order of the policy rules of the second sub-set of policy rules based on one or more of their source Internet Protocol (IP) addresses, destination IP addresses, network usage statistics, applications, interfaces, rule tags, priorities, and parameters.

26. The system of claim 23, wherein said deleting the third sub-set of policy rules comprises deleting policy rules of the third sub-set of policy rules based on one or more conflicts between policy rules of the third sub-set of policy rules and the retrieved set of policy rules.

* * * * *